United States Patent
Batten

(10) Patent No.: US 11,096,008 B1
(45) Date of Patent: Aug. 17, 2021

(54) INDOOR POSITIONING TECHNIQUES USING BEACONS

(71) Applicant: Republic Wireless, Inc., Raleigh, NC (US)

(72) Inventor: Dayne Batten, Cary, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 17/101,150

(22) Filed: Nov. 23, 2020

(51) Int. Cl.
| | |
|---|---|
| *H04W 4/021* | (2018.01) |
| *H04W 4/80* | (2018.01) |
| *G06N 20/00* | (2019.01) |
| *H04W 4/33* | (2018.01) |
| *H04B 17/318* | (2015.01) |
| *H04W 4/18* | (2009.01) |

(52) U.S. Cl.
CPC ............ *H04W 4/021* (2013.01); *G06N 20/00* (2019.01); *H04B 17/318* (2015.01); *H04W 4/185* (2013.01); *H04W 4/33* (2018.02); *H04W 4/80* (2018.02)

(58) Field of Classification Search
CPC ........ G06N 20/00; H04W 4/021; H04W 4/33; H04W 4/185; H04W 4/80; H04B 17/318
USPC ..................................................... 455/456.3
See application file for complete search history.

(56) References Cited

U.S. PATENT DOCUMENTS

| | | | |
|---|---|---|---|
| 7,945,271 B1* | 5/2011 | Barnes ................. | H04W 64/00 455/456.1 |
| 2017/0188188 A1* | 6/2017 | Kang .................. | H04L 61/6022 |
| 2018/0014161 A1* | 1/2018 | Warren ................ | H04W 4/023 |
| 2018/0255426 A1* | 9/2018 | Liao .................... | G06F 3/04883 |

OTHER PUBLICATIONS

Machine Learning-Aided Indoor Positioning Based on Unified Fingerprints of Wi-Fi and BLE, Tsuchida et al. (Year: 2019).*

* cited by examiner

*Primary Examiner* — William Nealon
(74) *Attorney, Agent, or Firm* — Gregory Stephens

(57) ABSTRACT

Techniques are disclosed for determining a location of a mobile device within an area of interest. One example computing system includes a processor configured to: obtain location information for areas of interest from a first device, the location information comprising signal strength readings associated with signal sources; receive a location request from a second device, the location request comprising signal strength readings associated with a current position of the second device; determine, using a machine learning model, the current position corresponds to a fingerprint within a location map, wherein the machine learning model is trained to: (i) generate the location map comprising fingerprints based on the location information; and (ii) determine a location based on a probability that a position matches a fingerprint in the location map; and determine that the current position corresponds to the fingerprint; and generate display information that includes the location of the fingerprint.

20 Claims, 7 Drawing Sheets

INDOOR POSITIONING TECHNIQUES USING BEACONS

TECHNICAL FIELD

Examples described herein are generally related to techniques for indoor positioning techniques using beacons, and some examples more specifically describe techniques that can accurately map an indoor device location using one or more Bluetooth low energy (BLE) beacons or WiFi network access points.

BACKGROUND

Many portable communication devices include location determination systems such as, for instance, the Global Positioning System (GPS) or Global Navigation Satellite System (GNSS). There are numerous instances when the precise location of a device may be of significant importance. However, GPS begins to degrade and or fail in some situations, especially when a device is located indoors. For example, standard GPS may suffer from inaccurate elevation measurements, despite providing accurate latitude and longitude information. This lack of precision may be especially compounded in rooms of multi-floor buildings, high-rise buildings, and skyscrapers.

SUMMARY

Various embodiments of the present disclosure relate to techniques for determining indoor positioning using beacons. One example computing system includes a non-transitory computer-readable medium; and a processor in communication with the non-transitory computer-readable medium, the processor configured to execute instructions stored in the non-transitory computer-readable medium to: obtain a corpus of location information associated with a plurality of areas of interest from a first communication device, the corpus of location information comprising signal strength readings associated with a plurality of signal sources; receive a location request from a second communication device, the location request comprising one or more signal strength readings associated with a current position of the second communication device; determine, using a machine learning model, the current position corresponds to a fingerprint within a location map, wherein the machine learning model is trained to: (i) generate the location map comprising a plurality of fingerprints based on the corpus of location information; and (ii) determine a location based on a probability that a position matches a fingerprint in the location map; and determine that the current position corresponds to the fingerprint; and generate display information that includes location information associated with the fingerprint.

One example non-transitory computer-readable medium includes program code that is executable by a processor to cause the processor to train a machine learning model to: receive a corpus of location information a plurality of areas of interest from a communication device, the corpus of location information comprising signal strength readings associated with a plurality of signal sources; generate fingerprints for the plurality of areas of interest based on the corpus of location information, wherein each of the fingerprints is associated with an area of interest; determine, for each of the plurality of areas of interest, a positional probability based on the signal strength readings for the respective areas of interest; and generate a location map comprising the fingerprints, wherein the location map is based on threshold values for the positional probabilities.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the one or more certain examples.

DETAILED DESCRIPTION

Figure 1:
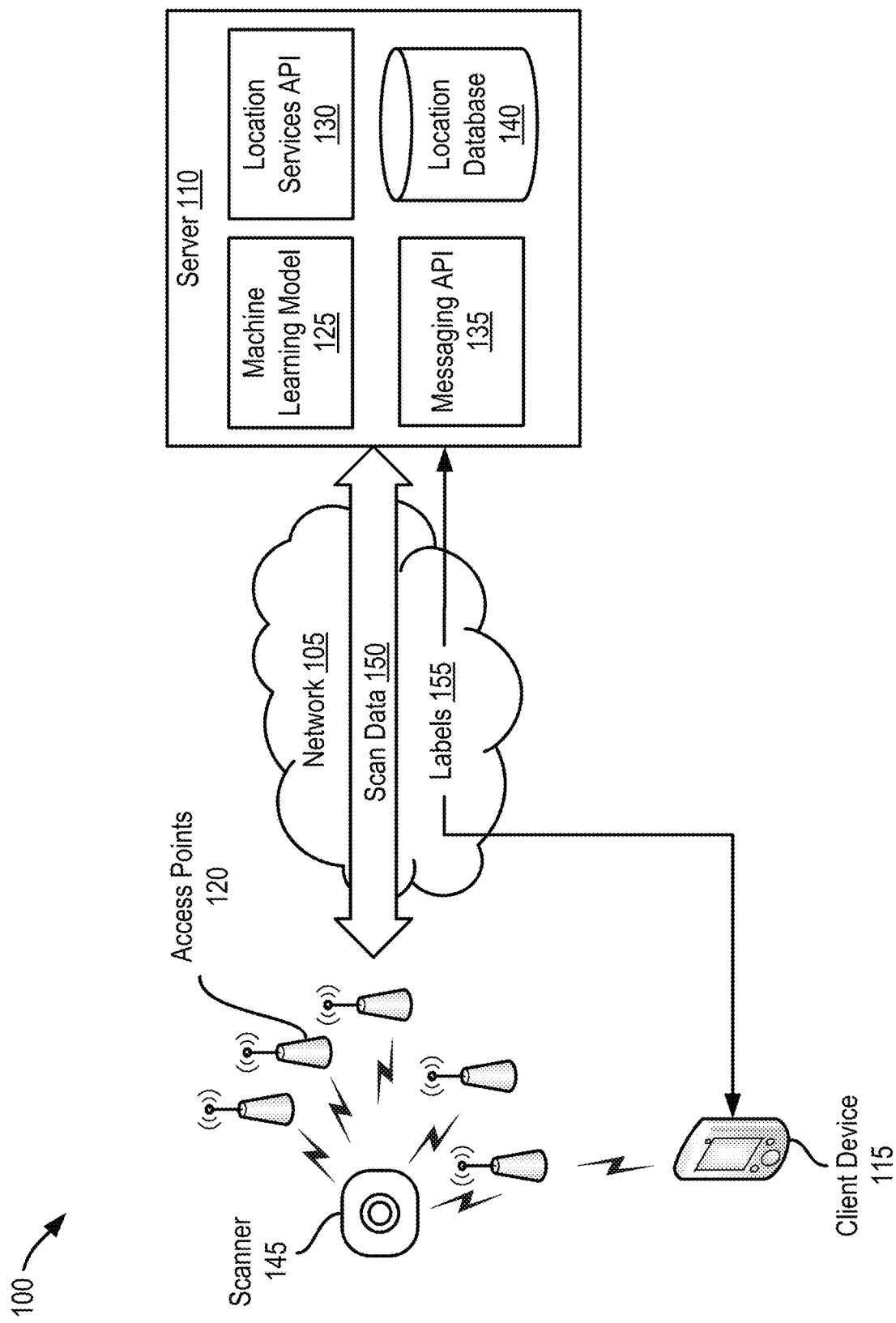
FIG. 1 shows a block diagram for a networked environment used to create and implement an indoor positioning system according to this disclosure.

Certain aspects and features of the present disclosure involve techniques for determining indoor positioning using beacons. Some example systems can provide indoor positioning services using a client device. Further, some example techniques can provide indoor positioning services, using more accurate location information, which can be obtained from beacons via a communications network, such as a communications network suitable for making and receiving text messages or telephone calls. This increase in accuracy of location information can be used to reduce an amount of time for first responders to provide aid to those in need, track employees or inventory, locate lost or missing devices, etc.

The illustrative examples described herein disclose systems, methods, and computer program products for creating, mapping, and implementing an indoor positioning system based on the operation of 802.11 (or later) WiFi access points and BLE beacons using the Bluetooth 4.0 low energy standard (or later). The systems and methods of the invention may be implemented in and performed by network based communications server(s) and other related components (e.g., databases), and software instructions executed by some or all of such devices and components, as will be explained in detail below.

The description of illustrative examples are provided merely as examples, not to limit or define the limits of the present subject matter, but rather to provide examples to aid understanding thereof. Various examples are described herein, which provides further description, and variations of such examples would be understood by one of skill in the art.

Advantages offered by various examples may be further understood by examining this specification and/or by practicing one or more examples of the claimed subject matter.

People commonly use wireless devices, e.g., smartphones indoors, such as within an office building. While accurately locating a device within the building is useful, it can be difficult. This can be the result of difficulties receiving traditional location services, e.g., GPS. But it can also be due to the nature of the locations provided by such services. Knowing a person's latitude, longitude, and altitude may be useful for vehicle navigation, but it may not be particularly helpful when trying to find a person in a building. Instead, locations within a building are typically given with respect to a particular floor and room, not geographical coordinates. Thus, mapping these locations in a way that enables a device to determine its location in terms of such features could provide a number of advantages.

There are numerous instances where accurate mapping and location functions may provide significant benefits. For instance, accurate mapping and location functions can provide improvements in real world applications such as a deployment of emergency services; employee productivity or tracking; locating lost, missing, or stolen devices; or inventory tracking or loss prevention among others. The present disclosure provides location services that include such mapping and location functions. For example, the indoor positioning system provides mapping that includes generating one or more heat maps for a floorplan. In some examples, a user that is in possession of a scanning device may obtain a highly effective set of training data (e.g., RF signals) for a floorplan to be mapped. For example, the user can cover as much unique space in the area of interest, by entering and circumnavigating each room in a manner that provides the greatest area coverage for generating heat maps in the floorplan. These heat maps represent RF signals that correspond to pinpoint locations of a scanning device that is located within the floorplan.

One solution to improve accuracy may involve deploying an array of fixed beacons (e.g., BLE beacons, WiFi access points, etc.) that are tied to known locations. These fixed beacons may then transmit beacon signals that provide information about the transmitting beacon, such as an identifier, a room number, a floor number, etc. Certain aspects according to this disclosure leverage existing WiFi access points to provide scan data for indoor positioning. Additionally, certain aspects utilize BLE beacons to provide scan data for indoor positioning. Advantageously, BLE beacons may provide an inexpensive solution to bolster indoor positioning scan data that may already be obtained from existing WiFi access points. Further, BLE beacons may have a sufficiently small form factor, footprint, or overall size that enables multiple BLE beacons to be positioned in a myriad of positions throughout an indoor space.

Thus, when a device connects to, or receives signals from, one of these fixed beacons, it can determine its location based on a correspondence, e.g., a mapping, between the source of the received signals and the established physical location of that source. This solution can provide very good accuracy when deployed throughout an indoor location. By doing so, an area of interest can be mapped to a certain level of precision based on the number of such signal sources and where they are located. Since most residential and especially enterprise locations utilize WiFi for Internet access, they will have deployed one or more WiFi access points. Thus, using a combination of WiFi access points and BLE beacons, according to certain aspects of this disclosure, the indoor positioning system can more accurately map an area of interest.

Advantageously, by leveraging existing systems that typically include WiFi access points, this disclosure may also provide added cost-saving benefits by using both WiFi access points and BLE beacons, thereby reducing an overall number of new BLE beacons that are required to provide such accurate mapping. Accordingly, this disclosure describes techniques for utilizing the existing WiFi access points or other infrastructure wireless communications devices, in combination with BLE beacons, to more accurately map an area of interest throughout an indoor location. Once these areas of interests have been accurately mapped, an indoor positioning system may then be subsequently used to locate devices within a given area of interest in real time. In some examples, the indoor positioning system may be located remotely, e.g., on a networked server. In other examples, the indoor positioning system may provide an indoor location locally, e.g., via a location services application that is being executed on a client device.

Locating such devices may be desirable for a number of reasons. Users frequently use their mobile devices to send and receive messages and/or make calls. These mobile devices can include numerous software applications that allows users to communicate with networked users or entities, e.g., via the Internet. For example, in an emergency, a user may need to request emergency services for assistance from a law enforcement agency (LEA), fire department, emergency medical services (EMS), hazardous materials (HAZMAT) response team, etc. In this example, some users may request these emergency services via an application that supports location-based services.

Continuing with this example, a user can place a call or send a text message with a request for emergency services. The device may then determine its location within an indoor floorplan and an the device, e.g., through an application programming interface (API), may attach the user's location information to the request for emergency services. Since mobile devices can move and operate virtually anywhere an Internet connection is available, there is a need for accurate location information for such emergency service requests. Further, providing accurate, up-to-date location information to emergency service dispatchers can increase timeliness and efficacy of responses to requests for emergency services.

Techniques described herein can be used to more accurately determine locations for communications devices in an indoor location, space, or area of interest that is covered by multiple BLE beacons, WiFi access points, or other wireless transmitters or access points. Certain aspects include an indoor positioning system that provides more precise location services for communication devices that enter or traverse an indoor location, space, or area of interest. Advantageously, the indoor positioning system described herein may provide valuable location services, which may enable first responders to receive more accurate information. In other examples, the indoor positioning system may allow for a tracking employees or inventory items, thereby increasing a productivity of business or providing loss prevention. Further, the indoor positioning system may be implemented in a cost-conscious manner, e.g., by leveraging a combination of existing WiFi access points and/or utilizing low-cost BLE beacons.

Reference is now made to the drawings, wherein like reference numerals are used to refer to like elements throughout. In the following description, for purpose of explanation, numerous specific details are set forth in order to provide a thorough understanding thereof. It may be evident, however, that various examples can be practiced without these specific details. In other instances, well known structures and devices are shown in block diagram form in order to facilitate a description thereof. The intention is to cover all modification, equivalents, and alternatives within the scope of the claims.

With general reference to notations and nomenclature used herein, one or more portions of the detailed description above or which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations require physical manipulations of physical quantities. Usually, though not necessarily, these quantities take the form of electrical, magnetic, or optical signals capable of being stored, transferred, combined, compared, or otherwise manipulated. It proves convenient at times, principally for reasons of common usage, to refer to these signals as bits, values, elements, symbols, characters, terms, or numbers. It should be noted, however, that all of these and similar terms are to be associated with the appropriate physical quantities and are merely convenient labels.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

FIG. 1 shows an example of a block diagram 100 for a networked environment that is used to create and implement an indoor positioning system according to certain aspects of this disclosure. The example indoor positioning system 100 includes access points 120 that facilitate communication between a client device 115, scanner 145, and server 110, e.g., via communications network 105. A communications network 105 may be a combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wide area network (WAN), wireless network (e.g., 802.11 WiFi), cellular network, or other communications networks.

The indoor positioning system 100 includes a number of access points 102 that have been positioned about a location of interest, such as a floor of an office building, a house, a mall, a movie theater complex, etc. Some access points 102 may be placed to provide wireless communication interfaces between devices within the location of interest, e.g., client device 115, and a network, e.g., network 105. Other access points 120 may be placed to output wireless signals to assist in providing location services in the system 100. Still others may be provided for other reasons. Any suitable wireless access point 120 may be used, such as WiFi access points, Bluetooth or BLE beacons, IEEE 802.15.4 mesh devices, etc.

In some examples, access points 120 may be WiFi access points that are capable of operating in dual bands of 2.4 GHz and 5 GHz. Further, each of the access points 120 may also be WiFi access points, BLE beacons, or WiFi access points that include an integrated BLE beacon. Other types of wireless transmitters or access points may be used in some examples, such as wireless mesh devices (e.g., operating using the 802.15.4 wireless standard), Internet-of-Things ("IOT") wireless devices, etc. As will be discussed in more detail later, such access points 120 may output signals in multiple different frequency ranges or according to multiple different wireless protocols.

The example indoor positioning system 100 includes a scanner 145 that may be mobile device that is capable of scanning for radio frequency (RF) signals such as WiFi, Bluetooth, BLE, IEEE 802.15.4, or other types of RF signals. In some examples, the scanner 145 may also be a client device. Further, in some examples, the scanner 145 may be accessed via a scanning application or graphical user interface (GUI) that is displayed on such a client device. In some examples, the scanning application may be a routine, feature, function, software component, or API that is available in a location services application. Further, the scanning application may be available in a distributed environment, e.g., that is available via a remote procedure call. The scanner 145 is in communication with server 110 via communications network 105 and/or access points 120.

In the example indoor positioning system 100, the scanner 145 moves around the area of interest and scans for RF signals (e.g., BLE beacon signals, WiFi signals, etc.) to detect RF signal information at various locations, e.g., scans may be performed at intervals of one meter within the area of interest to establish a grid of scan locations within the area of interest. The RF signal information may include, for example, a signal type, network name (e.g., service set identifier (SSID)), media access control (MAC) address (e.g., basic service set identifier (BSSID)), signal strength (e.g., received signal strength indicator (RSSI), channel, data rate, encryption format, etc. In some examples, the RF signal information may include timing information (e.g., a timestamp, time of arrival, periodicity, or other timing data). In this example, the scanner 145 scans for RF signals and obtains RF signal information that is associated with a set of access points 120. Each of the measurements taken by the scanner 145 of the various received signals at each of the various scan locations within the area interest are then collected as scan data 150, which may then be sent to a server 110 that is capable of providing location services. For example, the server 110 can use the scan data 150 to train a machine learning model 125, which is discussed in greater detail below.

For example, the scanner 145 scans for the access points 120 that are dispersed throughout an area of interest. An area of interest may correspond to an indoor location within a building. For instance, the area of interest may include an office floorplan, a floor in a building, a set of rooms, a space in a building, a portion of a space in a building, a particular room such as an office, a conference room, a breakroom, a restroom, etc. In some examples, the scanner 145 scans for RF signals to obtain signal strength readings that may be used to map the indoor location. The scanner 145 sends scan data 150 that corresponds to the RF signals and/or the RF signal information to server 110.

In some examples, the area of interest may broadly include a location corresponding to a street address, a building, or a geofenced location. In other examples, the area of interest can describe a floor within a building, a floorplan map, a portion or section of a building, a room or group of rooms, an area within a room, etc. Further, the area of interest may be assigned a name. For example, the area of interest may have a predefined label or a user-defined label that corresponds to or otherwise describes the area of interest, such as a room number, conference room name, etc. The indoor positioning system described herein can use these labels and/or areas of interest to generate "fingerprints" using certain characteristics. For example, fingerprints" for specific labels, locations, or areas of interest can be determined using signal strength readings from access points that are spread throughout the building. These fingerprints may include identifiable parameters associated with respective access points that allow the indoor positioning system to more accurately map areas of interest within the building.

The scanner 145 may include custom software designed to recognize BLE beacons, WiFi, wireless, or other suitable access points 120 and/or WiFi access points 120. The scanner 145 can include software that is capable of scanning for, or otherwise detecting, RF signals associated with the access points 120. For example, the scanner 145 may detect beacon frames for the access points 120. A beacon frame may include a MAC address header, a body, and a frame check sequence (FCS). A body of a beacon frame may include a timestamp, a beacon interval, a network capability, SSID, other timing information, network information, other parameters, etc. Further, the scanner 145 may obtain signal strength readings from each access point 120 and organize the signal strength data into a signal strength data set (e.g., scan data 150) that is referred to, more generally, as advertising data, service advertisements, beacon data, BLE beacon data, WiFi scan, or WiFi scan data, etc. In one example, the scan data 150 may include a beacon frame that includes of a MAC address of an access point 120.

In addition, many access points 120 may be WiFi access points that are capable of operating in dual bands of 2.4 GHz and 5 GHz. Further, each of the access points 120 may also be WiFi access points, BLE beacons, or WiFi access points that include an integrated BLE beacon. Thus, when available, the signal strength data set, scan data 150, for an access point 120 may incorporate the signal strength reading for a 2.4 GHz band, 5 GHz band, and/or a BLE beacon. In some examples, an overall quality or precision of the location services provided by the server 110 may be enhanced by including both a 2.4 GHz and 5 GHz signal strength reading for each of the WiFi access points 120. Further, the scan data 150 may include BLE beacons or WiFi scan data that includes an associated RSSI reading that is expressed in dB or some other discernible strength parameter for each access point 120.

At any given moment, the scanner 145 may be able to pass scan data 150 to the server 110 via the communications network 105. The server 110 may then store the received scan data 150. For example, the server 110 can store the scan data 150 in the location database 140. The server 110 may perform the processing described herein.

In this example, the server 110 provides location services for indoor positioning, according to certain aspects. The server 110 shown in FIG. 1 includes several components, including a machine learning model 125, location services API 130, messaging API 135, and location database 140. Further, the components of the server 110 may be hardware devices, but in some examples, each of the components of the server 110 can include one or more software applications or virtual machines being executed by one or more processors. In some examples, the server 110 may be a cloud computing device.

The server 110 receives the scan data 150 from the scanner 145 via the communications network 105. Additionally, the server 110 can receive labels 155 from the client device 115 via the communications network 105. In some examples, the labels 155 may be predefined name that is associated with an area of interest. In other examples, the labels 155 may be designated by a user of the client 115, e.g., via a location services application. The server 110 includes a location database 140. The server 110 can use the location database 140 to store location information (e.g., scan data 150 and labels 155). However, it should be appreciated, that in some examples, the location database 140 may not be co-located with the server 110.

The server 110 also includes the machine learning model 125. In this example, the server 110 may train the machine learning model 125 to determine a location of a device when location services are requested. The machine learning model 125 may be trained using any suitable deep learning technique. For instance, the machine learning model 125 may be trained using a deep neural network (DNN) (e.g., a recurrent neural network (RNN), long-short term memory network (LSTM), convolutional neural network (e.g., a region convolutional neural network ("R-CNN") or Fast R-CNN), a deep residual network (e.g., ResNet-101), etc. Once trained, the server 110 may execute the trained machine learning model 125 to identify a current location of a device in response to a request for location services.

Training the machine learning model 125 may involve obtaining a corpus of training data. For example, the server 110 may receive location information from the scanner 145 that is associated with a multiple areas of interest. In this example, the corpus of location information includes signal strength readings at various scan locations for areas of interest within a building, such as offices, conference rooms, workrooms, break rooms, lobbies, etc. In some examples, each area of interest may include one or more signal sources, such as one or more access points 120.

For instance, each area of interest may include a signal source that is an access point 120. Each of the access points 120 can provide the scanner 145 with scan data 150 at various scan locations that indicates a signal strength reading for each detectable access point 120. In some examples, the locations of each access point 120 may correspond to a label 155 corresponding to an area of interest. Further, each label 155 may correspond to location information (e.g., a floorplan, location data, labels 155, etc.) that is associated with an access point 120 (e.g., a MAC address associated with an access point 120). In turn, the scanner 145 can provide the scan data 150 to the machine learning model 125 via the communications network 105 and the server 110.

In some examples, the corpus of training data also includes a floorplan. Further, the training data and/or floorplan may include one or more physical characteristics of a building. For instance, the machine learning model 125 can retrieve a floorplan of the indoor location that includes pre-labeled areas of interest (e.g., rooms, hallways, common areas, walls, floors, levels, etc.). In some examples, the floorplan of the indoor location may also include locations for and a list of access points 120 corresponding to their relative positions associated with the floorplan. The machine learning model 125 can use location data from the scan data 150 to generate a map of the indoor location that includes the relative strength of the signal readings for various areas of interest within the building, using the floorplan. This can help resolve ambiguities when later attempting to determine a device's position in the area of interest. For example, a potential location may be excluded due to a physical obstacle or being physically unrealistic.

In some examples, the corpus of training data may include an effective range of an access point 120. The effective range may be associated with a predetermined distance associated with an access point 120. But in some examples, this predetermined distance may not necessarily reflect an actual range for which a RF signal is observable. For example, a presence (or absence) of certain physical barriers, such as interior or exterior walls may increase or reduce an actual range that a RF signal is observable. In some examples, a clear line of sight may increase a physical distance or other spatial relationship for which the RF signal corresponding to an access point 120 is observable. Further, in some examples, the training data may include a location history (e.g., one or more last known locations). Advantageously, training data that includes the effective range of an access point 120 may be used to reduce a number of detected signals that appear to be beyond the effective range (e.g., RF signals that are detected by a scanner 145 but indicate a significant distance from the access point 120).

In some examples, when initially scanning an area to gather training data, a greater number of scans for an area of interest may provide the machine learning model 125 with a greater amount of training data. Such an increased amount of training data may allow the machine learning model 125 to map the area of interest with increased accuracy, thereby improving an overall accuracy of the indoor positioning system 100. For instance, when obtaining training data, a user that is walking through an area to be mapped, and is in possession of a scanner 145, can collect scan data for multiple locations within an area of interest. The scanner 145 may collect a greater amount of training data for a scanning interval having a 2-second duration, and the scanner 145 would transmit twice as scan data 150 than if the scanning interval were 4 seconds. This additional scan data 150 may then provide more training data, which in turn may lead to a more accurate mapping of the area of interest.

Further, the user in possession of the scanner 145 may cover as much unique space in the area of interest, that is to be mapped, as possible. Each room may be entered and circumnavigated in a manner that provides the greatest area coverage to obtain the most effective training data and/or data fitting, which can then be applied using the positioning algorithm In some examples, the training process may include requests for additional training data (e.g., scan data 150) by the machine learning model 125. For example, the machine learning model 125 may be capable of automatically request or observe scans every few seconds. The time between scans may be designated or modified by the server 110 or the machine learning model 125. Further, the time between scans may be varied, e.g., to include scans every second, every 2 seconds, etc. During training, the scanner 145 sends the training data (e.g., scan data 150) to the server 110.

Once the server 110 receives the corpus of training data, the machine learning model 125 can use the corpus of training data (e.g., scan data 150) to train to determine fingerprints for different locations within areas of interest in a building. For example, the machine learning model 125 sorts the scan data 150 that is received from scanner 145 based on scans from the scanner 145, e.g., as the scanner 145 moves throughout a building. The machine learning model 125 can generate a map of the indoor location based on the signal strength readings contained within the scan data.

For instance, the machine learning model 125 can generate "fingerprints" for specific locations or areas of interest. The machine learning model 125 can do so by mapping these locations and/or areas of interest based on signal strength readings associated with the access points 120 that provide identifiable fingerprints. These fingerprints may include one or more parameters associated with the access points 120 that is mapped to a given location or area of interest (e.g., by MAC address). These locations may then be tied to a particular location on a floorplan, thus enabling the system to later determine a location on the floorplan based on a fingerprint match to scan data received from an electronic device.

For example, the one or more parameters for these fingerprints may include a range, hysteresis range, threshold value(s), etc. For example, a fingerprint that includes a hysteresis range may have signal strength readings that fall within uppermost and lowermost bounds of the range. In some examples, the fingerprint may include multiple hysteresis ranges that corresponds to single strength readings for both of a WiFi signal and a BLE beacon signal. Further, the one or more parameters may be correspond to one or more observable signal strength readings. In some examples, the parameters may statistically correlated to a combination of observable signal strength readings. Further, the parameters may include a combination of at least one WiFi signal strength reading and at least one BLE beacon signal strength reading.

In some examples, the machine learning model 125 can generate fingerprints for each of the locations corresponding to the areas of interest based on the training data (e.g., scan data 150). For example, training the machine learning model 125 may include applying statistical probabilities to the training data. In some examples, these statistical probabilities may correspond to a number of times that a WiFi signal or a BLE beacon was observed over a period of time.

For example, the machine learning model 125 may include a positioning algorithm that weights a probability that a device is in a particular location based on a highest number of times that observable signals (e.g., the WiFi signal or the BLE beacon) were detected over the duration of time. In one example, the machine learning model 125 may determine a high probability that the device is in a particular location or area of interest based on the number of observable signals over a five (5) second duration.

In this example, the machine learning model 125 includes a positioning algorithm that adds a weight to the number of observable signals. For instance, a high number of observable signals over such a duration may be weighted to reflect a strong statistical probability that the scanner 145 was in close relative physical proximity to a particular access point 120 when the training data (e.g., scan data 150) was obtained. In some examples, the machine learning model 125 may use timing information to weight scan data 150. For instance, the machine learning model 125 may add statistical weight to observable signals based on a consistency of signal strength readings over the duration. The machine learning model 125 can use such modelling to map access points 120, e.g., by their corresponding MAC addresses, to various locations and areas of interest.

In some examples, the machine learning model 125 may be trained to improve location results using parameters in addition to signal strength readings. For example, the machine learning model 125 may be trained using one or more physical characteristics of a building. For instance, the machine learning model 125 may identify patterns within the corpus of training data. In some examples, these patterns may correspond to one or more physical characteristics of the building. For example, the patterns may be derived from signal strength readings that are associated with locations in a floorplan map that has one or more physical barriers.

Once trained, the server 110 can execute the machine learning model 125 to generate a location map having multiple fingerprints using the corpus of training data. For example, the machine learning model 125 can generate a location map that includes multiple fingerprints for various areas of interest in a building. In response to a request for location services, the machine learning model 125 can determine a specific location within the building using statistical probabilities. For instance, the machine learning model 125 can determine a probability that a position matches a fingerprint within the location map. To do so, the machine learning model 125 may use scan data 150 that is included in the request for location services.

In some examples, the scan data 150 may include a signal strength reading associated with a WiFi access point 120, a BLE beacon access point 120, or both. The machine learning model 125 may use a combination of a signal strength reading associated with a WiFi access point 120 and a BLE beacon access point 120 to determine a matching fingerprint in the location map. When a matching fingerprint is identified, the machine learning model 125 determines that the current position of the requesting device corresponds to the fingerprint. The machine learning model 125 retrieves the floorplan to identify an area of interest that corresponds to the location.

As described above, the machine learning model 125 may be trained to identify results corresponding to mapped locations and/or areas of interest by matching fingerprints. In this example, the machine learning model 125 can improve these results, e.g., by filtering these results using the physical characteristics of a building. The machine learning model 125 may be trained to eliminate potential matching results (e.g., candidate fingerprints) based on threshold values associated with the physical characteristics of the building.

For example, the machine learning model 125 may identify a candidate fingerprint based on a strong observable signal strength reading that exceeds a predetermined minimum threshold value. The machine learning model 125 can retrieve the floorplan to identify physical characteristics of the building associated with the location. For instance, the machine learning model 125 may determine a presence of a multiple floors, a relative size of a room, a relative distance or spatial location of the access point 120 from which the observable signal was received, a proximity to a wall, a proximity to electrical devices, a line of sight, etc. The machine learning model 125 can use these physical characteristics to rule out locations that may have candidate fingerprints but could not be realistic matches, e.g., because it would put the device in physically impossible locations.

One example of a physical characteristic that can be used to rule out an improbable location is a physical distance. For example, a physical distance can be used by the machine learning model 125 to rule out a location that is too remote from the scanner 145 but would otherwise be a potential match for a candidate fingerprint corresponding to an observable signal from an access point 120 associated with that particular location. For example, the machine learning model 125 may determine the candidate fingerprint corresponds to a location on a first floor of a building. But the machine learning model 125 may determine that the access point 120 is located on a second floor of the building, e.g., based on MAC address of the access point 120. In response, the machine learning model 125 can eliminate the apparent match based on the relative location of the access point 120.

In some examples, the machine learning model 125 may eliminate fingerprints based on an effective range of an access point 120, which may not necessarily correspond to an actual range. The machine learning model 125 may eliminate the candidate fingerprint match despite receiving an observable signal strength reading. For example, the machine learning model 125 may determine that the observable signal corresponds to a location that is distant, e.g., based on the effective range associated with that access point 120. In response, the machine learning model 125 can eliminate that location as a potential location of the scanner 145 based on the observable signal being beyond the effective range. Similarly, the machine learning model 125 can use physical barriers such as interior or exterior walls to rule out other candidate fingerprints. Further, the machine learning model 125 may also use a location history (e.g., one or more last known locations) to rule out certain candidate fingerprints.

Further, the machine learning model 125 can generate display information (e.g., a GUI, graphical representation, or virtual representation, etc.) that includes the location information associated with the fingerprint. The machine learning model 125 can send the display information to the requesting device (e.g., client device 115).

In addition, the server 110 includes a location services API 130. The server 110 uses the location services API 130 to provide the client device 115 with an API that provides location functions in a location services application. The location services API 130 can enable a number of functions such as sending and receiving location data, identifying an indoor position, retrieving fingerprint information, labelling locations, other functions, etc., or a combination of these. The client device 115 can use the location services API 130 in the location services application to send or receive location information from the server 110. For instance, the client device 115 can receive a current location from the server 110 via the location services API 130. In some examples, the client device 115 can use the location services application to send a user input (e.g., touch input, voice command, gesture, etc.) that includes a request to label or re-label a particular area of interest.

Further, the server 110 includes a messaging API 135. In this example, the server 110 uses the messaging API 135 to provide the client device 115 with an API that integrates messaging functions into the location services application. Messaging APIs 135 (e.g., SMS APIs, MMS APIs, representational state transfer (REST) APIs, etc.) can enable a number of functions such as sending and receiving user information, SOS messages, notifications, text, pictures, audio, videos, software updates, other functions, etc., or a combination of these. The client device 115 can use a messaging API 135 in the location services application to send information to the server 110. For instance, the client device 115 can send labels 155, such as those described above, to the server 110 via the messaging API 135.

In one example, the client device 115 includes the location services application that is accessible by a user. In some examples, the user can access the location services application to perform scanning functions. For instance, the client device 115 may include a microphone that allows the user to enter a user input verbally. The user can provide the user input in the location services application, e.g., that includes a voice command to obtain a current location. In response to the user input, the client device 115 transmits a request for location services for its current location to the server 110. The request may include information such as observable signal strength readings for one or more nearby access points 120.

In some examples, the location services application may include a user interface (e.g., a GUI) that enables user inputs to change certain location settings. For example, a user may use a microphone in the client device 115 to input the voice command "create location" in the location services application. The "create location" function may allow a user to create a label (e.g., a label 155) or description that is associated with a particular area of interest that is identified by the user. The location services application may also include an ability to create a list of locations, e.g., which can be sorted and/or organized numerically (e.g., room 124, 125, 126, etc.) or by type (e.g., offices, restrooms, hallways, or by floors within a building, etc.).

Further, the location services application may provide these capabilities via a visual user interface (e.g., a GUI), gestures (e.g., using a camera), touch inputs (e.g., via a keypress or touch screen), or audible commands (e.g., using a microphone), or a combination of these. In some examples, the location services application may also include an ability to create a new location, modify a location, label or name an area of interest, designate a sub-location in an area of interest (e.g., a bifurcated office space), change other location settings, etc.

For example, a user may add a new device (e.g., a new access point 120) to an existing network. The new device may include a user-generated location name. For example, a user may use the location services application to access a microphone in client device 115 and to input a voice command "pair beacon with [location name]." In response, the location services application may cause the client device 115 to generate and send a label 155 (e.g., with the user-generated location name) to the server 110. In some examples, the server 110 receives the label 155 and pairs the new device (e.g., the beacon) by assigning the location name to the area of interest associated with the beacon.

In some examples, the location services application includes access to location information stored in a cloud network. For example, an authorized user may be able to access past scan data 150 stored in the cloud via the location services application. In some examples, the location services application can access a cloud computing device (e.g., server 110) to retrieve scan data 150. In one example, the client device 115 may download location information, such as fingerprints, scan data 150, labels 155, etc., from the cloud (e.g., via location database 140). Further, in some examples, the client device 115 may download location information (e.g., a user's location history) to the cloud.

In one example, the server 110 can receive a user request for location services within a building. For example, the server 110 receives the request for locations services from the client device 115 via the messaging API 135. The server 110 can execute the trained machine learning model 125 to identify the location of the client device 115, e.g., using fingerprints associated with an area of interest corresponding to the current location information. Further, the machine learning model 125 can determine a matching fingerprint associated with the area of interest. The machine learning model 125 sends the matching fingerprint to the location services API 130.

In this example, the location services API 130 can generate a graphical representation of the location or area of interest associated with the matching fingerprint and display an indicator to show the determined position of the device. In some examples, the graphical representation may include a label 155, floorplan, avatar, or another graphical feature associated with the area of interest. The location services API 130 sends the graphical representation of the location to the messaging API 135.

Continuing with this example, the server 110 can send a message to the client device 115 that includes the identified location. For example, the server 110 can send the message using the messaging API 135. Further, the message may include the graphical representation or an image of the identified location. The floorplan and the identified location may be rendered on any device having a screen and the graphical processing ability to render the message. For example, the floorplan may be rendered on the client device 115. In some examples, the floorplan may be requested by, and rendered on, the scanner 145.

In another example, a requesting device (e.g., client device 115) may seek the location of a target device (e.g., scanner 145). For instance, a supervisor in possession of the client device 115 may wish to locate a particular employee that she knows is carrying the target device, scanner 145. The supervisor can enter a user input, via the client device 115, that sends a location request to the server 110 with a request for the current location of the target device, scanner 145. The server 110 may process the request to determine the target device's location using any of the techniques described herein. The server 110 sends the current location to the client device 115.

The current location of the target device, scanner 145, may then be returned to the client device 115 in any number of formats. For example, the location may be returned verbally, as an audio notification that includes the current location. In another example, the current location may be sent to the client device 115 as a text notification. In other examples, the location may be sent to the client device 115 as a graphical representation, e.g., that includes a map of the floorplan. Further, the graphical representation may include an icon associated with the target device positioned relative to its current location within the floorplan.

Figure 2:
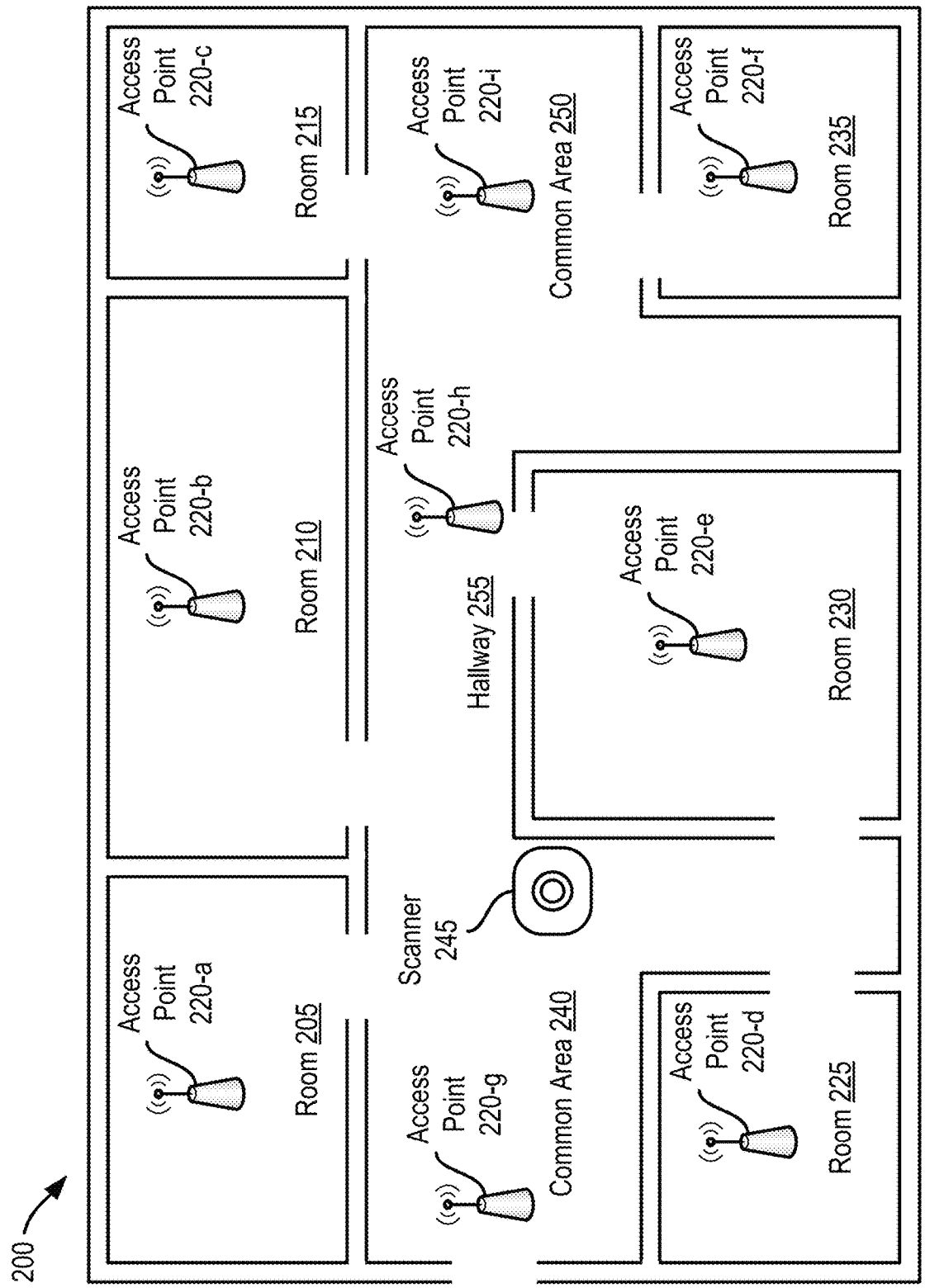
FIG. 2 shows a set of access points relative to an example floorplan for training purposes according to this disclosure.

FIG. 2 shows a set of access points 220 relative to an example floorplan 200 for training purposes according to certain aspects of this disclosure. For example, the floorplan 200 is a computer-generated floorplan that corresponds to a floor in a building and depicts various areas of interest. In this example, the areas of interest have been pre-defined to cover the floorplan 200 shown in FIG. 2. However, in some examples, a user may designate the areas of interest, e.g., using a messaging API or a location services API. In this example, each room 205-215, 225-255 includes its own access point 220. In addition, a scanner 245, which may be a client device, is depicted as being positioned within the floor plan. Each of the access points 220 and scanner 245 may include any or all of their respective features described herein and with respect to like devices, e.g., as described above in FIG. 1.

The floorplan 200 includes pre-defined label data identifying specific rooms and/or locations within the floorplan. For instance, the floorplan 200 includes representations of six (6) different rooms 205, 210, 215, 225, 230, and 235 and a single main hallway 255 that has been subdivided into three sub-areas, including common areas 240 and 250. Each room may represent an office, a conference room, a breakroom, a restroom, etc. Further, each room 205-215, 225-255 includes its own label.

For example, the rooms 205, 215, 225, and 235 may all be offices and may include labels "Office 1," "Office 2," "Office 3," and "Office 4," respectively. Similarly, the rooms 210 and 230 may be conference rooms that are labeled "Conference Room A" and "Conference Room B," respectively. Additionally, the floorplan 200 includes common areas 240, 250, and a hallway 255, may be labeled (e.g., by user-defined labels 155) as "East Commons," "West Commons," and "Hallway," respectively. In some examples, the labels may be computer-generated. But in other examples, the labels may be customizable. For example, the labels may be assigned based on a received user input from a client device or the scanner 245. Further, the labels may be modified based on a user input via a location services application.

In some examples, the scanner 245 may be utilized to collect location information (e.g., corresponding to RSSI or other signal strength readings) for the locations of interest (e.g., rooms) throughout the floorplan 200. Further, the scanner 245 may send the collected location information to a server (e.g., server 110) or a machine learning model (e.g., machine learning model 125). Such location information may be utilized as training data for the machine learning model. In other examples, the scanner 245 may be a target device that is requesting location services.

In some examples, the server can send a message to the scanner 245 that includes the identified location. For example, the identified location may be a room within a floorplan. In other examples, the location may be a pinpoint location that includes a portion or section of a room or a precise lat/long coordinate location. And in some examples, the server can send the message using a messaging API. Further, the message may include a graphical representation or an image of the identified location. The floorplan 200 and the identified location may be rendered on any device having a screen and the graphical processing ability to render the message. For example, the floorplan 200 may be rendered on a client device, such as client device 115.

While a single floor has been illustrated as the floorplan 200 (e.g., having multiple areas of interest), many areas of interest encompass multiple floors within a building. The techniques described herein are not limited to just a single floor. Often times, a wireless device may detect an observable signal from known access points 220 located on other floors. These access points 220 may also be used when training, and ultimately, when determining a position of a device. For example, the machine learning model may be able to predict a user's location using fingerprints that correspond to an area of interest without an exact geo-coordinate location of a MAC address for an access point.

In addition to being represented as a set of room names or labels, floorplan 200 could be represented in a server (e.g., server 110) as a digital image. Such a digital image may allow the server to determine a more precise coordinate location. For instance, the coordinate system may be overlaid onto or otherwise associated with the image and may be an (x, y, z) coordinate system, a latitude and longitude (lat/long) coordinate system, or any other coordinate system known to or referenced by a mapping and positioning algorithm. Further, the digital image may also be geo-referenced (e.g., geo-tagged), such that a coordinate location within that image could be translated to a geographic location represented in terms of latitude, longitude, and elevation.

Figure 3:
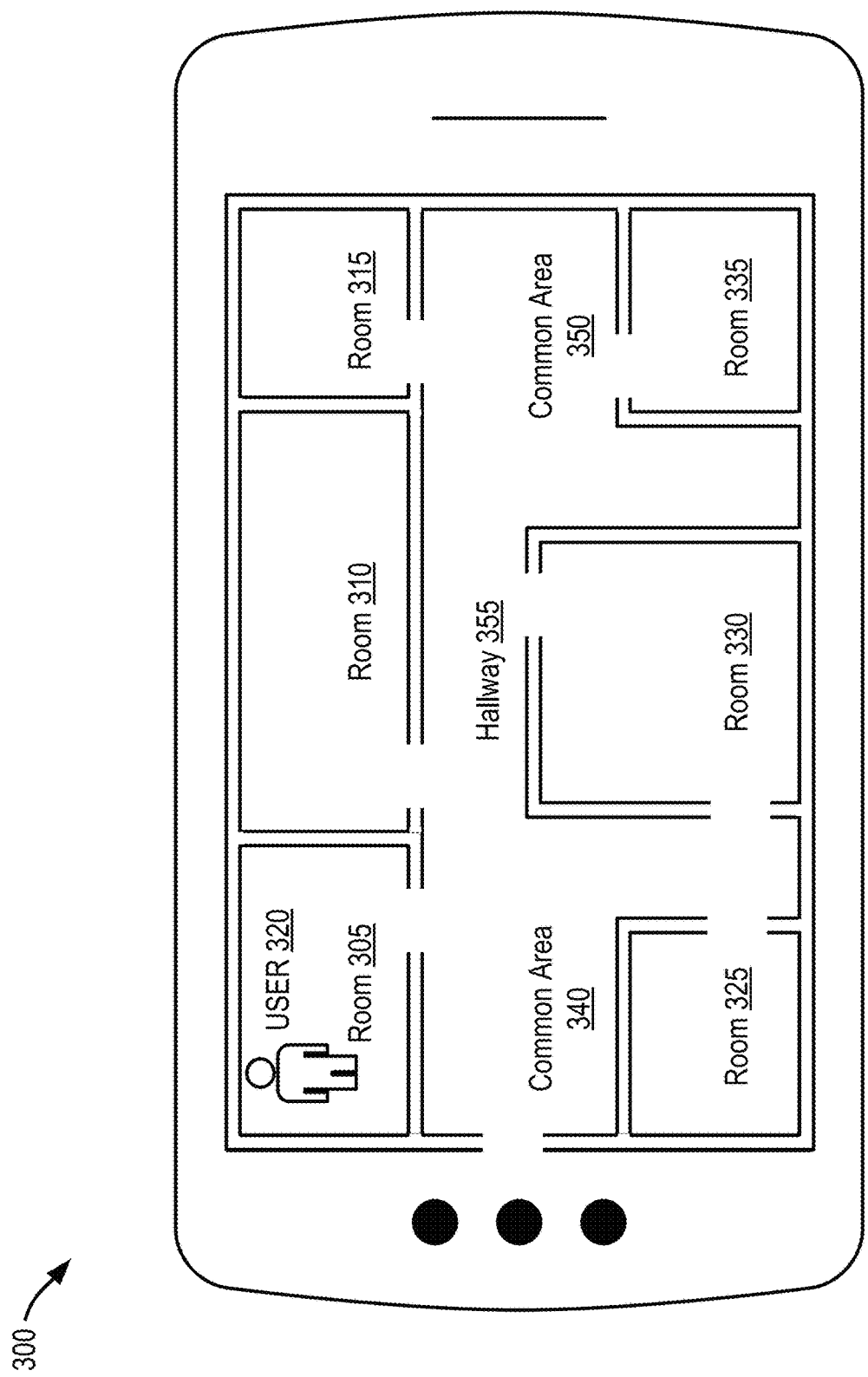
FIG. 3 shows an example of a graphical representation for a floorplan according to this disclosure.

FIG. 3 shows an example of a graphical representation 300 for an example floorplan according to certain aspects of this disclosure. The graphical representation 300 includes a floorplan that is substantially similar to the floorplan 200 depicted in FIG. 2. Further, the graphical representation 300 shows the floorplan that includes six (6) different rooms 305, 310, 315, 325, 330, and 335 and a single main hallway 355 that has been subdivided into three sub-areas, including common areas 340 and 350. Each room 305-315, 325-355 includes its own label. For example, rooms 305, 315, 325, and 335 may be labeled "Office 1," "Office 2," "Office 3," and "Office 4," respectively. Rooms 310, 330 may be labeled "Conference Room A" and "Conference Room B," respectively. And common areas 240, 250, and hallway 255 may be labeled "East Commons," "West Commons," and "Hallway," respectively. In some examples, graphical representation 300 may be generated using any of the techniques described herein.

The example graphical representation 300 also includes a user 320. In this example, the graphical representation of a user 320 may be an avatar for a user. For example, the graphical representation 300 may be generated in response to a user request for location services. In one example, the user request may correspond to a user input in a location services application that is being executed in a client device (e.g., client device 115). In response to the request, a server (e.g., server 110) generates and sends the graphical representation 300 to the client device.

In this example, the client device is a smartphone that displays the graphical representation 300, e.g., via the location services application. Further, in this example, the server determines based on observable signals accompanying the request for location services that the client device is present in room 305. Thus, the server generates the graphical representation 300 that depicts the user 320 as having a current location within room 305. In some examples, the graphical representation 300 may include the label corresponding to room 305, e.g., "Office 1."

Figure 4:
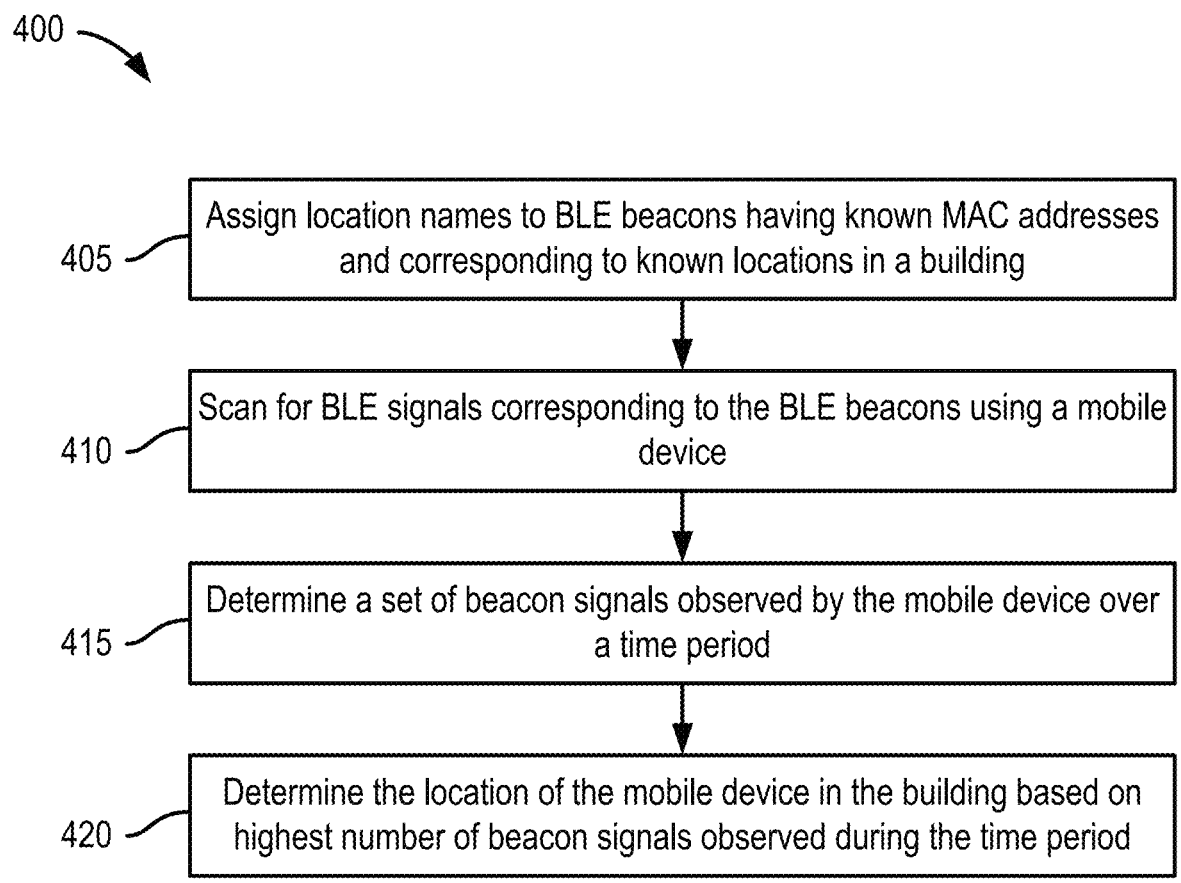
FIG. 4 shows an example method for determining indoor positioning for a given location in an area of interest according to this disclosure.

FIG. 4 shows example method 400 for determining indoor positioning for a given location in an area of interest according to certain aspects of this disclosure. In some examples, the steps shown in FIG. 4 may be implemented in program code that is executable by a computing device, for example, the server 110 or a processor in a general-purpose computer or server. In some embodiments, one or more steps shown in FIG. 4 may be omitted or performed in a different order. Similarly, additional steps not shown in FIG. 4 may also be performed. For illustrative purposes, the steps of the method 400 are described below with reference to components described above with regard to the indoor positioning system 100 shown in FIG. 1, but any suitable system according to this disclosure may be employed.

The method 400 begins at block 405, when the indoor positioning system (e.g., indoor positioning system 100) assigns location names to BLE beacons having known MAC addresses and corresponding to known locations in a building. For example, the indoor positioning system 100 can assign location names to BLE beacons that are integrated within each of the access points 120. In some examples, the BLE beacons may be spread throughout an indoor location. For example, the BLE beacons in access points 120 may be spread throughout at a floorplan, such as the floorplan 200 described above, with respect to FIG. 2. In one example, the BLE beacons may corresponding to rooms in a building, where each room in the floorplan includes a wirelessly connected BLE beacon.

At block 410, a mobile device (e.g., client device 115) scans for BLE signals corresponding to the BLE beacons. For example the indoor positioning system 100 includes a scanner 145 that can scan BLE beacons to obtain scan data 150. The scanner 145 may be a client device. In some examples, the scanner 145 may be accessed to perform the scanning via a scanning application.

The scanner 145 scans the BLE beacons (e.g., corresponding to access points 120) that are dispersed throughout an area of interest, which may include an office floorplan, a floor in a building, a set of rooms, a space in a building, a portion of a space in a building, a particular room such as an office, a conference room, a breakroom, a restroom, etc. In some examples, the scanner 145 scans to obtain scan data 150 that may include signal strength readings, location information, timing information, etc. The scanner 145 sends the scan data 150 to server 110 via communications network 105.

At block 415, the indoor positioning system 100 determines a set of beacon signals that are observed by the mobile device (e.g., scanner 145). For the example, the scanner 145 may obtain an instantaneous sample of scan data 150 or a number of samples of scan data 150 over a time period. For example, the server 110 can determine the set of beacon signals that are observed by the scanner 145 based on the scan data 150. In some examples, the server 110 can determine the set of beacon signals by executing the location services API 130. The server 110 may determine the set of beacon signals using any of the techniques described herein.

In some examples, the server 110 provides the beacon signals received from the scanner 145 to a trained machine learning model 125. The server 110 can execute the trained machine learning model 125, which may determine a set or a subset of the beacon signals from the scanner 145. In one example, the trained machine learning model 125 determines the subset of the beacon signals from the scanner 145 based on a number of samples of scan data 150 that were obtained over a time period. For example, the trained machine learning model 125 may determine a minimum number of samples that are required to accurately determine a location. The trained machine learning model 125 may use the minimum number of samples to select the subset of sampled scan data 150 that were observed during the time period.

At block 420, the indoor positioning system 100 determines the location of the mobile device (e.g., client device 115) in the building based on a highest number of beacon signals that are observed during the time period from block 415. In this example, the highest number of beacon signals that is received by the scanner 145 and that corresponds to a particular access point 120 may be used to determine the location of the mobile device. For instance, the server 110 may receive a larger quantity of observable signals from one access point 120 than a second access point 120, over a short time duration (e.g., 5 seconds). The server 110 may determine the location of the mobile device based on this highest number of beacon signals based on the relative quantity of observed signals received for the short time duration. For example, the server 110 can use the scan data 150 to determine the location of the requesting device. The server 110 can execute the location services API 130 or a trained machine learning model 125 to perform this function. In some examples, the server 110 determines the number of BLE beacons that were observed over a period of time.

In some examples, the server 110 can determine a highest number of times that observable BLE beacons were detected over the duration of time. The server 110 can determine the probability that the device is in a particular location or area of interest based on the number of observable signals over a duration, e.g., a one (1), two (2), or five (5) second duration). In some examples, the server 110 may be trained to determine the location of the requesting mobile device based on a map of access points 120, e.g., that includes their corresponding MAC addresses. In other examples, the server 110 may determine the location based on a floorplan or a fingerprint according to the techniques described herein.

Figure 5:
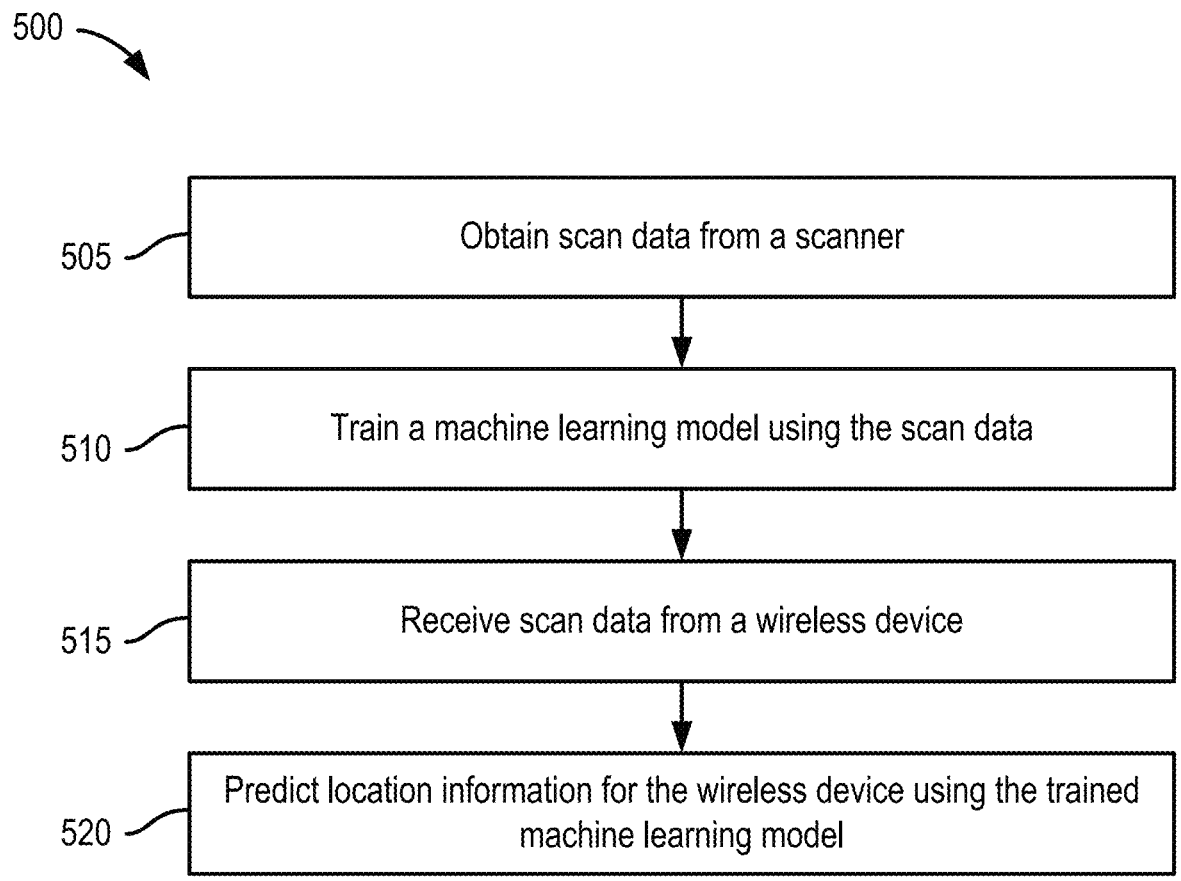
FIG. 5 shows an example method for training a machine learning model to determine indoor positioning for a location according to this disclosure.

FIG. 5 shows an example of a method 500 for determining indoor positioning for a given location in an area of interest according to certain aspects of this disclosure. In some examples, the steps shown in FIG. 5 may be implemented in program code that is executable by a computing device, for example, the server 110 or a processor in a general-purpose computer or server. In some embodiments, one or more steps shown in FIG. 5 may be omitted or performed in a different order. Similarly, additional steps not shown in FIG. 5 may also be performed. For illustrative purposes, the steps of the method 500 are described below with reference to components described above with regard to the system 100 shown in FIG. 1, but any suitable system according to this disclosure may be employed.

The method 500 begins at block 505, the indoor positioning system (e.g., indoor positioning system 100) obtains scan data (e.g., scan data 150) from a scanner (e.g., scanner 145). For example, the indoor positioning system 100 obtains scan data from the scanner 145 that observes signals from multiple access points (e.g., access points 120). Further, a user in possession of the scanner 145 may cover as much unique space in the areas of interest to be mapped, circumnavigating the areas of interest in a manner that provides the greatest area coverage to obtain the most effective training data, which can then be applied using the positioning algorithm In some examples, the training process may include requests for additional training data (e.g., scan data 150) by the machine learning model 125. In this example, the indoor positioning system 100 includes a server 110 that can receive scan data 150 from a scanner 145. In some examples, the scan data 150 may include signal information that corresponds to various location information that is obtained from access points 120 according to any of the techniques described herein.

In some examples, the scan data 150 may be obtained by a user in possession of the scanner 145. For example, the user may be walking through an area of interest to be mapped with the training-enabled scanner 145. Further, the user may be walking through the area to be mapped with the training enabled scanner 145 to cover as much unique space in the area of interest as possible. In some examples, the scanner 145 may scan each room in a manner to maximize an amount of scan data 150 that is obtained for the area of interest. For example, the user may enter and traverse the entirety of each room with the scanner 145 to obtain a large amount of scan data 150 for the training of a machine learning model.

At block 510, the indoor positioning system 100 trains a machine learning model (e.g., machine learning model 125) using the scan data 150. In this example, the indoor positioning system 100 uses the server 110 to train the machine learning model 125. Further, the machine learning model 125 uses the scan data 150 as training data.

In some examples, training the machine learning model 125 may involve requests for additional training data (e.g., scan data 150). For example, the machine learning model 125 may send a request to the scanner 145. Such a request may include instructions to perform scans for a particular location, area of interest, or periodicity. Further, the time between scans may be varied, e.g., to include scans every second, every 2 seconds, etc.

In this example, training the machine learning model 125 may include a positioning algorithm that adds a weight to adjust a statistical probability that a user is located in a given area of interest corresponding to a candidate fingerprint derived from the observed signals. For instance, a candidate fingerprint may be weighted to reflect statistical probabilities that account for a relative physical proximity to a particular access point 120, timing information, a consistency of signal strength readings over a duration, etc. The machine learning model 125 can use the positioning algorithm to map access points 120, e.g., by their corresponding MAC addresses, to various locations and areas of interest.

For instance, the machine learning model 125 generates fingerprints for specific locations or areas of interest. These fingerprints may be a mapping of locations and/or areas of interest that are based on signal strength readings. Further, the fingerprints may be derived using any of the algorithms described herein. In some examples, fingerprints include parameters associated with the access points 120. These parameters may include a range, hysteresis range, threshold value(s), etc. Further, the parameters may be statistically correlated to observed signal strength readings for WiFi scans, BLE beacons, or a combination of these.

In some examples, training the machine learning model 125 may also include parameters other than signal strength readings. For example, the machine learning model 125 may be trained using one or more physical characteristics of a building to identify locations and/or areas of interest. For example, the machine learning model 125 may be trained to filter results to eliminate candidate fingerprints. In some examples, training the machine learning model 125 includes discarding results based on signal propagation characteristics, a presence of a multiple floors, a relative size of a room, a relative distance or spatial location of a nearest access point 120, a proximity to a wall, a proximity to electrical devices, a line of sight, etc.

At block 515, the indoor positioning system 100 receives scan data 150 from a wireless device (e.g., client device 115). In this example, the client device 115 includes a location services application. A user may enter a request for location services to identify a current positioning of the client device 115. In response, the client device may execute a scanning application that obtains scan data 150. In some examples, the client device 115 can obtain scan data 150 according to any of the techniques described herein. The client device 115 sends the scan data 150 with the request for location services to the server 110.

At block 520, the indoor positioning system 100 uses the trained machine learning model 125 to determine location information for the wireless device. For example, the server 110 receives the request for locations services and the scan data 150 from the client device 115, which is described in block 515. The server 110 executes the machine learning model 125 to generate a location map having multiple fingerprints for various areas of interest in the building. In response to the request for location services from block 515, the machine learning model 125 can determine a specific location within the building using statistical probabilities, e.g., that includes a probability that a position matches a fingerprint within the location map according to any of the techniques described herein.

In this example, the machine learning model 125 identifies a matching fingerprint and the current position of the requesting client device 115. The trained machine learning model 125 sends the current position to the requesting client device 115. For example, the machine learning model 125 can send a text message that includes the position of the requesting client device 115 that reads "Office #307." In another example, the machine learning model 125 can send an audio message that uses a voice assistant, e.g., upon opening the message, which reads "Your current location is in Office #307." In some examples, the machine learning model 125 generates display information that includes the location information associated with the fingerprint. For example, the trained machine learning model 125 can generate display information that is similar to the graphical representation 300, which is described above, with respect to FIG. 3. The machine learning model 125 can send the display information to the requesting client device 115. In some examples, the server 110 may send the display information to the client device 115 using the location services API 130 or the messaging API 135.

Figure 6:
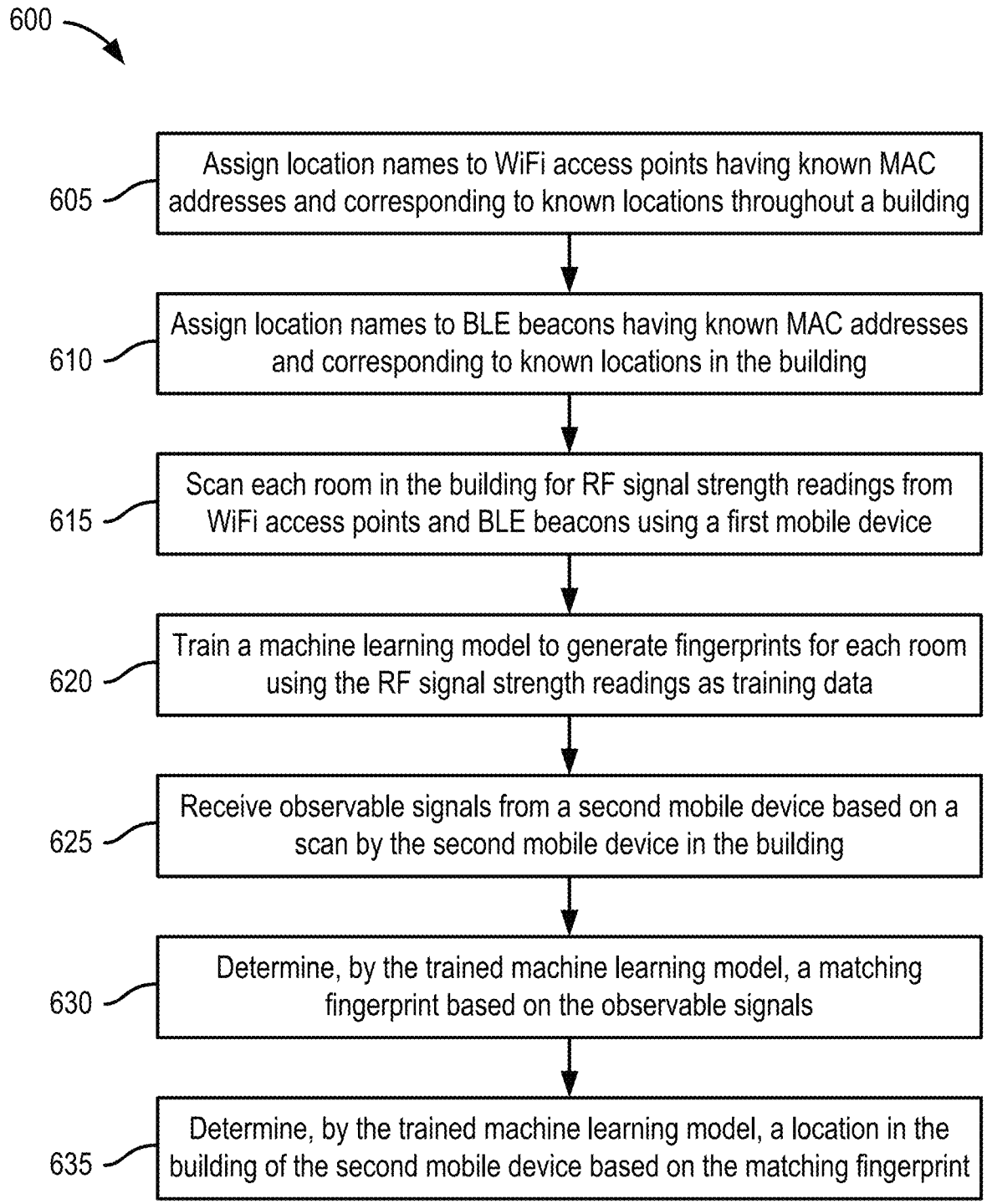
FIG. 6 shows an example method for determining indoor positioning for a location using a trained machine learning model according to this disclosure.

FIG. 6 shows an example of a method 600 for determining indoor positioning for a given location in an area of interest according to certain aspects of this disclosure. In some examples, the steps shown in FIG. 6 may be implemented in program code that is executable by a computing device, for example, the server 110 or a processor in a general-purpose computer or server. In some embodiments, one or more steps shown in FIG. 6 may be omitted or performed in a different order. Similarly, additional steps not shown in FIG. 6 may also be performed. For illustrative purposes, the steps of the method 600 are described below with reference to components described above with regard to the system 100 shown in FIG. 1, but any suitable system according to this disclosure may be employed.

The method 600 begins at block 605, when the indoor positioning system (e.g., indoor positioning system 100) assigns location names to WiFi access points having known MAC addresses and corresponding to known locations throughout a building. For example, the indoor positioning system 100 can assign location names to WiFi access points 120 during a network setup. In some examples, the WiFi access points 120 may be spread throughout an indoor location. For example, the WiFi access points 120 may be spread throughout at a floorplan, such as the floorplan 200 described above, with respect to FIG. 2.

At block 610, the indoor positioning system 100 assigns location names to BLE beacons having known MAC addresses and corresponding to known locations in the building. For example, the indoor positioning system 100 can assign location names to BLE beacons that are included within (e.g., disposed in) each of the access points 120. The indoor positioning system 100 may assign location names to BLE beacons during a network setup. In some examples, the BLE beacons may be spread throughout an indoor location. For example, the BLE beacons in access points 120 may be spread throughout at a floorplan, such as the floorplan 200 described above, with respect to FIG. 2. In one example, the BLE beacons may correspond to rooms in a building, where each room in the floorplan includes at least one BLE beacon. In some examples, each room in the floorplan includes at least one BLE beacon access point 120 and/or one WiFi access point 120 from block 605. In other examples, each room in the floorplan may include at least one BLE beacon that is integrated within one WiFi access point 120.

At block 615, a first mobile device scans each room in the building for RF signal strength readings (e.g., scan data 150) from WiFi signals and BLE signals. In this example, the first mobile device includes a scanner 145. Further, the indoor positioning system 100 scans each room to obtain scan data 150 using the scanner 145, which is similar to the scanning technique described above, with respect to block 505 in FIG. 5. In some examples, the scanner 145 may scan each room according to any of the techniques described herein.

At block 620, the indoor positioning system 100 trains a machine learning model (e.g., machine learning model 125) to generate fingerprints for each room using the RF signal strength readings (e.g., scan data 150) as training data. In this example, training the machine learning model 125 is substantially similar to the training described above, with respect to block 510 in FIG. 5. In some examples, the machine learning model 125 may be trained according to any of the techniques described herein.

At block 625, the indoor positioning system 100 receives observable signals from a second mobile device based on a scan performed by the second mobile device while in the building. In this example, the second mobile device may be a client device 115. Further, the client device 115 includes a location services application. A user may enter a request for location services to identify a current positioning of the client device 115. In response, the client device may execute a scanning application that obtains scan data 150. In some examples, the client device 115 can detect signals from various access points 120 according to any of the techniques described herein and provides scan data 150 based on the detected signals. Further, the scan data 150 may include WiFi signals and BLE beacon signals. The client device 115 sends the scan data 150 with the request for location services to the server 110.

At block 630, the indoor positioning system 100 determines, using the trained machine learning model, a location of the device based on the received scan data. For example, the trained machine learning model may determine a matching fingerprint based on the received scan data 150. For example, the machine learning model 125 can determine a statistical probability that a position corresponding to the scan data 150 matches a fingerprint within the location map according to any of the techniques described herein. In this example, machine learning model 125 can determines this statistical probability based on a correlation between the multiple detected signals obtained in block 615 and the fingerprints used during training, e.g., from block 620. Further, the machine learning model may determine a set of candidate fingerprints that have a high statistical probability of a match (e.g., above a threshold statistical value) for the request based on the scan data 150.

At block 635, the indoor positioning system 100 determines, by the trained machine learning model, a location in the building of the second mobile device based on the matching fingerprint. In this example, the machine learning model 125 can determine a specific location within the building using statistical probabilities according to any of the techniques described herein. For example, the machine learning model 125 can select a fingerprint from among the set of candidate fingerprints using characteristics associated with the scan data 150. In some examples, the machine learning model 125 may determine a location based on the selected fingerprint.

For instance, the machine learning model 125 may determine the location based on a physical characteristic of the building. In one example, the machine learning model 125 may determine a relative location in the building from which the scan data 150 was obtained, e.g., with respect to a floorplan. The machine learning model 125 can use a presence of a multiple floors, a relative size of a room, a relative distance or spatial location of the access point 120, a proximity to a wall, a proximity to electrical devices, a line of sight, etc. to rule out locations that cannot be matches. Further, the machine learning model 125 can use an effective range of an access point 120, physical barriers, a line-of-sight, physical distance, spatial relationships, or a location history to rule out certain candidate fingerprints.

Once the machine learning model 125 determines the matching fingerprint and its corresponding location, the trained machine learning model 125 can generate display information that includes the location information associated with the fingerprint. For example, the trained machine learning model 125 can generate display information that is similar to the graphical representation 300, which is described above, with respect to FIG. 3. The machine learning model 125 can send the display information to the requesting client device 115. Additionally, or in the alternative, the server 110 may send the display information to the client device 115 using the location services API 130 or the messaging API 135.

Although the above operations are described sequentially, many of the operations can be performed in parallel or concurrently. In addition, the order of the operations may be rearranged. A process may have additional steps not included in the FIGS. 3-6. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

Figure 7:
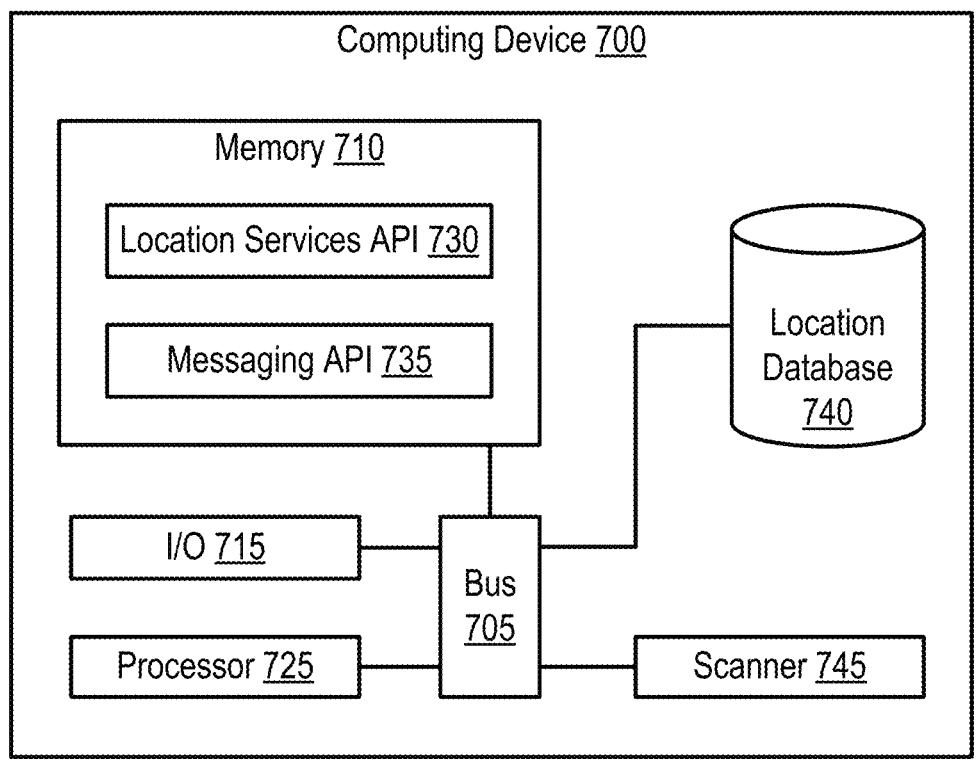
FIG. 7 an example computing device suitable for use with example systems for indoor positioning according to this disclosure.

FIG. 7 an example computing device suitable for use with example systems for indoor positioning according to certain aspects of this disclosure. The example computing device 700 may be, for example, any of the server 110, a computer, or any other type of suitable computing device. In some examples, the computing device 700 can be any suitable computing device for receiving and sending messages according to the techniques described herein.

The computing device 700 includes a processor 725 communicatively coupled to other hardware via a bus 705. The processor 725 can include one or more commercially available processors, embedded processors, secure processors, microprocessors, dual microprocessors, multi-core processors, other multi-processor architectures, another suitable processing device, or any combination of these. A memory 710, which can be any suitable tangible (and non-transitory) computer-readable medium such as random access memory (RAM), read-only memory (ROM), erasable and electronically programmable read-only memory (EEPROMs), or the like, embodies program components that configure operation of the computing device 700. In the embodiment shown, computing device 700 further includes a location database 740, which may include any or all of its respective features described herein. The computing device 700 also includes one or more input/output (I/O) interface components 715.

I/O components 715 can include one or more network interface devices or any components that facilitate a network connection. Examples include, but are not limited to, gateways, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, GPRS, EDGE, EV-DO, SVDO, UMTS, HSDPA, HSUPA, HSPA+, LTE, LTE Advanced, 5G, 5G NR, WiMAX, Wi-Fi, or other mobile communications network).

I/O components 715 may be used to facilitate wired or wireless connections to devices such as one or more displays, game controllers, keyboards, mice, joysticks, cameras, buttons, speakers, microphones and/or other hardware used to input or output data. Memory 710 represents non-volatile storages such as magnetic, optical, or other storage media included in computing device 700 and/or coupled to processor 725.

In some embodiments, the computing device 700 includes a location database 740. The location database 740 may include information related to observable location data or particular signal strength readings associated with the computing device 700. For example, the location database 740 may include fingerprint data that corresponds to particular areas of interest that are mapped by the computing device 700.

In some examples, the processor 725 may execute program code or instructions stored in memory 710 (e.g., location services API 730 or messaging API 735). In some examples, the processor 725 may execute program code or instructions for the location services API 730 or messaging API 735 stored in memory 710.

It should be appreciated that computing device 700 may also include additional processors, additional storage, and a computer-readable medium (not shown). The processor(s) 725 may execute additional computer-executable program instructions stored in memory 710. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

Certain aspects and features of the present disclosure involve systems capable of providing SOS call routing for emergency calls in a communications network with which a user may send or receive message. The methods, devices, and systems described above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

That which is claimed is:

1. A computing system comprising:
   a non-transitory computer-readable medium; and
   a processor in communication with the non-transitory computer-readable medium, the processor configured to execute instructions stored in the non-transitory computer-readable medium to:
   obtain a corpus of location information associated with a plurality of areas of interest from a first client device, the corpus of location information comprising signal strength readings associated with a plurality of signal sources;
   receive a location request from a second client device, the location request comprising one or more signal strength readings associated with a current position of the second client device;
   determine, using a machine learning model, the current position corresponds to a fingerprint within a location map, the location map comprising one or more physical characteristics of a building, wherein the machine learning model is trained to:
   (i) generate the location map comprising a plurality of fingerprints based on the corpus of location information and the one or more physical characteristics; and
   (ii) determine a location based on a probability that a position matches a fingerprint in the location map; and
   determine that the current position corresponds to the fingerprint; and
   generate display information that includes location information associated with the fingerprint.

2. The computing system of claim 1, wherein the corpus of location information comprises Bluetooth Low Energy (BLE) beacon information.

3. The computing system of claim 1, wherein the corpus of location information comprises BLE beacon information and Wi-Fi signal information.

4. The computing system of claim 1, wherein the one or more signal strength readings associated with a current position includes a BLE beacon signal, and wherein the second client device comprises a smartphone, tablet, or laptop.

5. The computing system of claim 1, wherein the processor is further configured to execute instructions stored in the non-transitory computer-readable medium to:
   transmit the location information to the second client device, wherein the location information is configured to cause the second client device to display a graphical user interface (GUI).

6. The computing system of claim 5, wherein the location request is a first request, wherein the GUI comprises location information associated with the fingerprint, and the processor further configured to execute instructions stored in the non-transitory computer-readable medium to:
   receive a second request from the second client device to modify location information associated with the fingerprint; and
   in response to the request, modify the location information that is associated with the fingerprint.

7. The computing system of claim 6, wherein the location information comprises a name or a graphical representation corresponding to an area of interest that is mapped to the fingerprint.

8. The computing system of claim 1, wherein the machine learning model is further trained to:
   retrieve a floorplan associated with the plurality of areas of interest;
   determine label information for the plurality of areas of interest based on the floorplan; and
   annotate the location map using the label information.

9. The computing system of claim 1, wherein the machine learning model is further trained to:
   retrieve a floorplan associated with the plurality of areas of interest;
   compare the location map with the floorplan; and
   modify the location map based on one or more differences between the location map and the floorplan.

10. The computing system of claim 1, wherein the machine learning model is further trained to:
    determine the plurality of fingerprints for each of the plurality of areas of interest based on one or more signal strength readings associated with a respective of area of interest.

11. The computing system of claim 1, wherein the machine learning model is further trained to:
    determine the plurality of fingerprints for each of the plurality of areas of interest based on a total number of signal strength readings observed within a respective of area of interest.

12. A method comprising:
    obtaining, by a processor, a corpus of location information associated with a plurality of areas of interest from a first client device, the corpus of location information comprising signal strength readings associated with a plurality of signal sources;
    receiving, by the processor, a location request from a second client device, the location request comprising a signal strength reading associated with a current position;
    determining, using a machine learning model, whether the current position corresponds to a fingerprint within a location map, the location map comprising one or more physical characteristics of a building, wherein the machine learning model is trained by:
    (i) generating the location map comprising a plurality of fingerprints based on the corpus of location information and the one or more physical characteristics; and
    (ii) determining a location based on a probability that a position matches a fingerprint in the location map; and
    determining, by the processor, that the current position corresponds to the fingerprint; and
    generating, by the processor, display information that includes location information associated with the fingerprint.

13. The method of claim 12, wherein the corpus of location information comprises BLE beacon information and Wi-Fi signal information.

14. The method of claim 12, wherein the location request is a first request, and further comprising:
    transmitting, by the processor, the location information to the second client device, wherein the location information is configured to cause the second client device to display a GUI, and wherein the GUI comprises the location information associated with the fingerprint;
    receiving, by the processor, a second request to modify location information associated with the fingerprint; and in response to the second request, modifying, by the processor, the location information that is associated with the fingerprint.

15. The method of claim 14, wherein the location information comprises a name or a graphical representation corresponding to an area of interest that is mapped to the fingerprint.

16. The method of claim 12, wherein the machine learning model is further trained by:
retrieving a floorplan associated with the plurality of areas of interest;
determining label information for the plurality of areas of interest based on the floorplan; and
annotating the location map using the label information.

17. The method of claim 12, wherein the machine learning model is further trained by:
retrieving a floorplan associated with the plurality of areas of interest;
comparing the location map with the floorplan; and
modifying the location map based on one or more differences between the location map and the floorplan.

18. The method of claim 12, wherein the machine learning model is further trained by:
determining the plurality of fingerprints for each of the plurality of areas of interest based on either (i) one or more signal strength readings associated with a respective of area of interest or (ii) a total number of signal strength readings observed within a respective of area of interest.

19. A non-transitory computer-readable medium comprising program code executable by a processor to cause the processor to train a machine learning model to:

obtain a corpus of location information associated with a plurality of areas of interest from a first client device, the corpus of location information comprising signal strength readings associated with a plurality of signal sources;
receive a location request from a second client device, the location request comprising one or more signal strength readings associated with a current position of the second client device;
determine, using a machine learning model, the current position corresponds to a fingerprint within a location map, the location map comprising one or more physical characteristics of a building, wherein the machine learning model is trained to:
(i) generate the location map comprising a plurality of fingerprints based on the corpus of location information and the one or more physical characteristics; and
(ii) determine a location based on a probability that a position matches a fingerprint in the location map;
(iii) determine that the current position corresponds to the fingerprint; and
(iv) generate display information that includes location information associated with the fingerprint.

20. The non-transitory computer-readable medium of claim 19, wherein generating the location map further comprises program code executable by a processor to:
retrieve a floorplan associated with the plurality of areas of interest;
compare the location map with the floorplan; and
modify the location map based on one or more differences between the location map and the floorplan.

* * * * *